United States Patent
Hurchalla et al.

(10) Patent No.: US 12,291,209 B2
(45) Date of Patent: May 6, 2025

(54) STATE DRIVEN MICRO-VALUE ARCHITECTURE

(71) Applicant: GM GLOBAL TECHNOLOGY OPERATIONS LLC, Detroit, MI (US)

(72) Inventors: Robert Hurchalla, Sterling Heights, MI (US); Umer Khalid, Farmington Hills, MI (US); Suresh Munagapati, Cumming, GA (US); Dennis J Carroll, Leander, TX (US); Charles Alvin Wiley, Austin, TX (US); Richard Alan Range, Jr., Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 350 days.

(21) Appl. No.: 18/163,904

(22) Filed: Feb. 3, 2023

(65) Prior Publication Data
US 2024/0262361 A1 Aug. 8, 2024

(51) Int. Cl.
*B60W 30/18* (2012.01)
*B60W 50/12* (2012.01)

(52) U.S. Cl.
CPC ...... *B60W 30/18109* (2013.01); *B60W 50/12* (2013.01); *B60W 2520/28* (2013.01)

(58) Field of Classification Search
CPC ..... B60W 30/18109; B60W 30/18118; B60W 30/18127; B60W 50/12
See application file for complete search history.

(56) References Cited

U.S. PATENT DOCUMENTS

| | | | |
|---|---|---|---|
| 9,697,655 B1* | 7/2017 | Eyhorn | G01M 15/14 |
| 2018/0065639 A1* | 3/2018 | Barath | F16H 61/66272 |
| 2021/0100069 A1* | 4/2021 | Saldin | H04W 88/16 |
| 2022/0219691 A1* | 7/2022 | Maleki | G06F 11/0754 |
| 2023/0008967 A1* | 1/2023 | Iun | G08G 1/0141 |
| 2025/0059884 A1* | 2/2025 | Aljarro | G01V 3/15 |
| 2025/0060302 A1* | 2/2025 | Aljarro | E21B 47/006 |

* cited by examiner

*Primary Examiner* — John Kwon
(74) *Attorney, Agent, or Firm* — Lorenz & Kopf LLP

(57) ABSTRACT

A method to assemble and orchestrate elemental value components to accomplish a meaningful higher value. The method including the steps of detecting, by a first sensor, a first vehicle operating parameter, generating, by the first sensor, a first sensor output indicative of the first vehicle operating parameter, populating, by a data pump, a first data repository entry indicative of the first sensor and the first vehicle operating parameter. The method is further operative for generating, by a first processor, a first micro-value output in response to the first data repository entry and a first micro-value algorithm associated with the first sensor, generating, by a concurrent second processor, a first vehicle control signal in response to the first data repository entry, the first micro-value output and a first decision repository table entry associated with the first micro-value output, and controlling, by a vehicle controller, a vehicle in response to the first vehicle control signal.

20 Claims, 4 Drawing Sheets

STATE DRIVEN MICRO-VALUE ARCHITECTURE

INTRODUCTION

The present disclosure generally relates to control systems in a process and architectures, and more particularly relates to a method and apparatus for use of a state driven micro-value architecture for control of complex electro-mechanical systems, such as an automobile including communication with a remote service. Micro-value architecture assembles and orchestrates components that are generally expected to encapsulate singular and indivisible function thus maximizing the reuse across purpose of use. These components offer meaningful and micro granular value that can be composed in an orchestration with other components to yield a higher value for greater cause and purpose.

Modern vehicles are increasingly being equipped with more and more electronics systems in order to enhance vehicle safety and performance. These electronic systems can include sensors for detecting system performance, occupant state and attentiveness, and external objects and environments as well as communicate with remote units and systems. Some of these sensors can be native to the vehicle platform and some can be added on with auxiliary systems. Sensor output can be used as input data for electronic control units for controlling engine performance, suspension and braking control, and even vehicle cabin conditions. Sensors, such as radars, lidars, and cameras are essential for detecting the environment around the vehicle to enable autonomous vehicle systems to safely control the vehicle. Global Navigation Satellite Systems (GNSS) are used to accurately detect a vehicle location in response to satellite signals in order to correlate the vehicle position with map data stored in a vehicle memory or the like.

In order to better distribute the computer processing demands of a modern vehicle, electronics systems are typically split by function with algorithms for each function being performed by a dedicated electronic control unit (ECU). These ECUs receive data from dedicated sensors, perform algorithms in response to the sensor data and generate control signals to transmit to various vehicle controllers and systems in order to control the performance of the vehicle. For example, a stability control system may receive data from wheel speed sensors, suspension sensors, brake controllers, steering controllers, GNSS and the like, detect anomalies in the vehicle handling, such as incorrect wheel speed or steering angle for the direction and speed of the vehicle, and generated control signals to adjust the steering, braking or throttle position of the vehicle. A significant problem is that the sensor data processing is limited to conditions known and predefined thus limiting the processing to static algorithms without regard to changing purpose of vehicle use. Another problem arises since the various tasks to the ECUs are compartmentalized within the vehicle control systems some sensor data may not be available to each of the ECUs. Future control algorithms may advantageously benefit from sensor data that is isolated from that particular ECU, thereby requiring a hardware change to realize the new benefit. Accordingly, it is desirable to address the aforementioned problems and to provide systems and methods for providing an efficient and easily updatable system architecture. Furthermore, other desirable features and characteristics of the present disclosure will become apparent from the subsequent detailed description and the appended claims, taken in conjunction with the accompanying drawings and the foregoing technical field and background.

SUMMARY

Vehicle control systems for controlling a vehicle operation in response to a plurality of micro-value applications in response to sensor output data. A vehicle control system performing a vehicle control algorithm is operative to receive output signals from the micro-value applications, and to determine corresponding vehicle system settings in response to a sensor data repository, a decision table and vehicle control parameters. In accordance with an exemplary embodiment, the vehicle control system includes a first sensor configured to detect a first vehicle operating parameter and to generate a first sensor output signal indicative of the first vehicle operating parameter, a memory configured to store a data repository and a decision repository table, a data pump configured to receive the first sensor output signal and generate a first entry in the data repository indicative of the first sensor and the first vehicle operating parameter, a first processor for performing a first micro-value algorithm and for generating a first micro-value output in response to the first entry in the data repository, a second processor for performing a vehicle algorithm and for generating a vehicle control signal indicative of a first output in the decision repository table in response to the first micro-value output and the first entry in the data repository, and a vehicle controller configured to control a vehicle system in response to the vehicle control signal.

In accordance with another aspect of the exemplary embodiment, the first vehicle operating parameter is a tire pressure, the first micro-value output is indicative of the tire pressure being less than a threshold value and the vehicle controller is configured to limit a vehicle speed.

In accordance with another aspect of the exemplary embodiment, a second sensor to detect a second vehicle operating parameter and wherein the first processor is further configured to perform second micro-value algorithm for generating a second micro-value output signal in response to a second entry in the data repository indicative of the second sensor and the second vehicle operating parameter.

In accordance with another aspect of the exemplary embodiment, a second sensor to detect a second vehicle operating parameter and wherein the first micro-value output is generated in response to a second entry in the data repository corresponding to the second vehicle operating parameter.

In accordance with another aspect of the exemplary embodiment, the vehicle controller is further operative to generate a data signal indicative of a vehicle control status and wherein the vehicle control signal is generated in response to the vehicle control status, the first micro-value output and the first entry in the data repository.

In accordance with another aspect of the exemplary embodiment, a transceiver for transmitting the first micro-value output and the first entry in the data repository to a server via a wireless network.

In accordance with another aspect of the exemplary embodiment, the data pump receives the first sensor output signal via a controller area network bus.

In accordance with another aspect of the exemplary embodiment, the first micro-value output is coupled to the second processor via an application programming interface.

In accordance with another aspect of the exemplary embodiment, the data pump is further operative to receive a plurality of sensor values from a plurality of sensors and to generate a plurality of data repository entries indicative of the plurality of sensor values and the plurality of sensors and wherein the first processor is further operative to perform a plurality of micro-value applications wherein each of the plurality of micro-value applications is associated with one of the plurality of sensors.

In accordance with another aspect of the exemplary embodiment, a method including detecting, by a first sensor, a first vehicle operating parameter, generating, by the first sensor, a first sensor output indicative of the first vehicle operating parameter, populating, by a data pump, a first data repository entry indicative of the first sensor and the first vehicle operating parameter, generating, by a first processor, a first micro-value output in response to the first data repository entry and a first micro-value algorithm associated with the first sensor, generating, by a second processor, a first vehicle control signal in response to the first data repository entry, the first micro-value output and a first decision repository table entry associated with the first micro-value output, and controlling, by a vehicle controller, a vehicle in response to the first vehicle control signal.

In accordance with another aspect of the exemplary embodiment, coupling, by an application programming interface, the first micro-value output from the first processor to the second processor.

In accordance with another aspect of the exemplary embodiment, the first vehicle operating parameter is an engine temperature and wherein the first micro-value output is indicative of the engine temperature exceeding a threshold value and wherein the vehicle controller is configured to limit a vehicle speed in response to the first vehicle control signal.

In accordance with another aspect of the exemplary embodiment, the first micro-value algorithm can be updated without altering an algorithm performed by the second processor to generate the first vehicle control signal.

In accordance with another aspect of the exemplary embodiment, generating, by the first processor, a second micro-value output in response to a second data repository entry and a second micro-value algorithm associated with a second sensor.

In accordance with another aspect of the exemplary embodiment, the first micro-value output is generated in response to a second data repository entry associated with a second sensor.

In accordance with another aspect of the exemplary embodiment, generating a user alert, via a user interface, in response to the first vehicle control signal.

In accordance with another aspect of the exemplary embodiment, the first decision table repository entry includes a plurality of input conditions and a plurality of vehicle system settings.

In accordance with another aspect of the exemplary embodiment, generating a vehicle operating status and wherein the first vehicle control signal is generated in response to the vehicle operating status and the first decision table repository entry.

In accordance with another aspect of the exemplary embodiment, a vehicle control system including a first sensor for generating a first data signal in response to a first vehicle condition, a second sensor for generating a second data signal in response to a second vehicle condition, a memory configured to store a data repository and a decision table, a data controller for generating a first data repository entry in the data repository in response to the first data signal and a second data repository entry in the data repository in response to the second data signal, a first processor for generating a first micro-value output signal in response to a first micro-value algorithm and the first data repository entry and for generating a second micro-value output signal in response to a second micro-value algorithm and the second data repository entry, a second processor for generating a first vehicle control signal in response to a vehicle control algorithm, the first micro-value output signal, the first data repository entry and a first decision table entry associated with the first sensor and for generating a second vehicle control signal in response to the vehicle control algorithm, the second micro-value output signal, the second data repository entry, and a second decision table entry associated with the second sensor, and a vehicle controller for controlling at least one of a throttle controller, a steering controller and a brake controller in response to the first vehicle control signal and the second vehicle control signal.

In accordance with another aspect of the exemplary embodiment, an application programming interface for coupling the first micro-value output signal and the second micro-value output signal from the first processor to the second processor.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
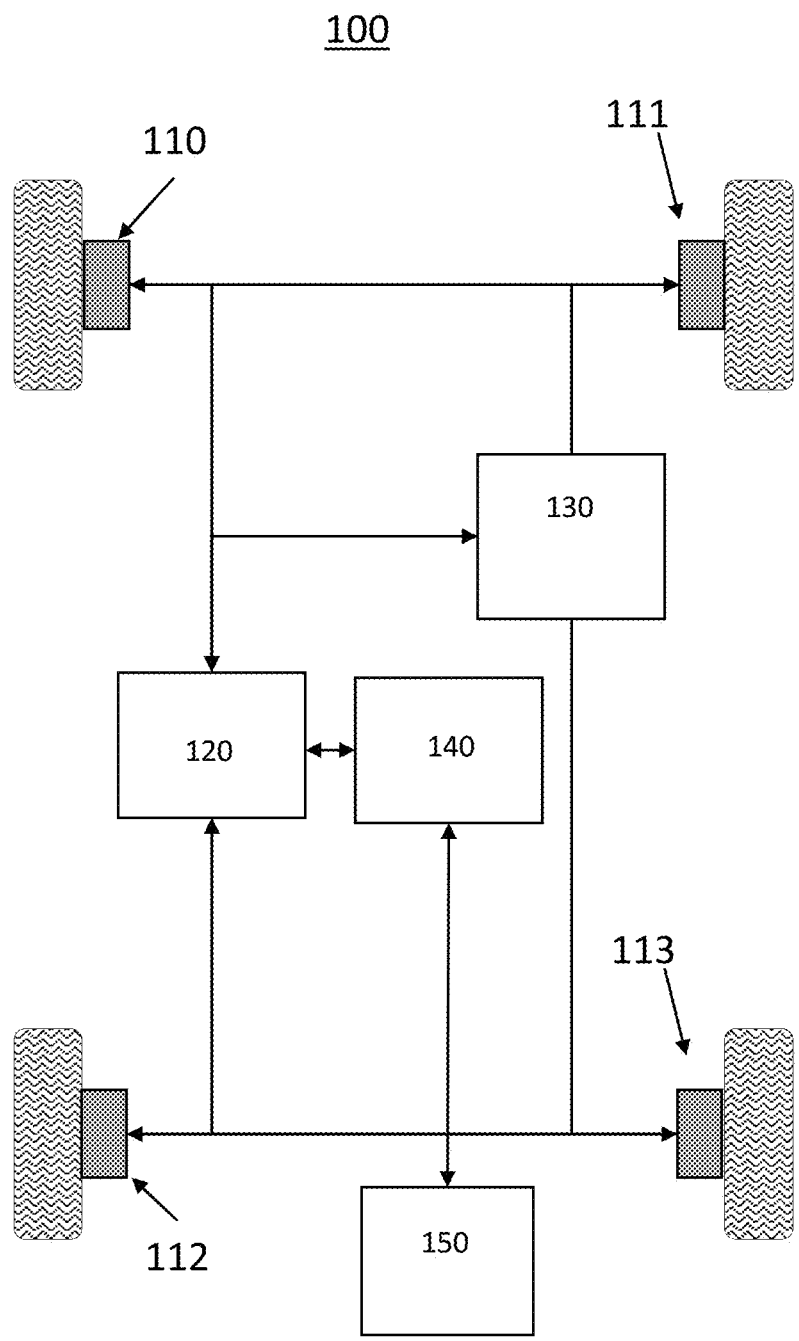
FIG. 1 shows an exemplary environment for a state drive micro-value architecture is shown in accordance with various embodiments.

Turning now to FIG. 1, an exemplary environment 100 for a state drive micro-value architecture is shown in accordance with various embodiments. The exemplary environment 100 includes a plurality of sensors 110, 111, 112, 113, a data board 120, a vehicle controller 130, a connectivity module 140, and a transceiver 150.

Device controls systems for controlling installations to address operational, performance and efficiency configuration detection and adjustment in response to varying operational context dynamically beyond static algorithmic processes enables safe and efficient use of various equipment. The equipment in one embodiment can be a wheeled or non-wheeled vehicle. In another embodiment can be a medical equipment serving life saving purpose. In an exemplary embodiment it could be a hybrid operational context with a Vehicle carrying medical equipment and other robotic devices thus requiring complex control systems orchestrated using a micro-functional value architecture. In some exemplary embodiments, the micro-value algorithms can be packaged to execute along with an orchestrator to coordinate, communication director facilitating communication across, decision tables to guide next best action, device registry to manage and track devices and sensors, data repository to manage the state, digital shield to enforce 4-dimensional authorization of micro-value algorithm mission operating person device to result in the device configuration adjustment in response to micro-value output.

While the exemplary embodiments are described in terms of vehicular systems, the underlying methods and systems are not limited to vehicular systems and can be advantageously applied on any number of systems or devices including robotics, medical systems, military control systems and the like. Missions described can referred to any purpose of use for the exemplary systems.

The exemplary environment 100 is illustrative of vehicular system for assembling data from sensors and other micro components constrained to run in isolation over a continuum specific to a mission or purpose. The system assembles the elemental, micro-value components from disparate sources based on the defined mission where no single component is allowed to aggregate the overall data or process. This allows assembly of components from a library at runtime where the micro-value components execute on the client or device. The system is further operative to assign configuration changes based on the task being executed. For example, a sensor captures wheel rotation activity. The communications director passes the sensor state to the supervisor and decision processor. The processor reviews the data table and learns the new configuration. The micro-value application assigns a new pressure setting to the suspension to absorb vibration.

The exemplary system is configured with a plurality of sensors 110, 111, 112, 113. Sensors are devices that detect changes in their environment and convert them into signals. They can be divided into two categories: passive and active. Passive sensors detect changes in the environment by detecting a change in resistance, light, sound, or temperature. For example, a thermometer is an example of a passive sensor because it detects changes in temperature by employing a sensor composed of two different metals which generate an electrical voltage or resistance when a temperature change occurs by measuring the voltage across the sensor terminals. An accelerometer is an example of a sensor that detects movement using electromagnetic sensing that measures the vibration of a structure. The force that is caused by the vibration causes the accelerometer to produce an electrical charge indicating how much force was exerted. Active sensors use energy to detect changes in their environment; for example, they use light or radio waves to sense changes on an object's surface. A radar is an example of an active sensor which transmits an electromagnetic pulse and analyses a returned reflection of the pulse to determine distances to objects within the radar field of view. The vehicular system may include tire air pressure sensors, shock pressure sensors, steering position sensors, engine temperature sensors, oil sensors, transmission state and temperature sensors among others.

In addition to the sensors, a transceiver 150 may form part of a communication system in the host vehicle and may be arranged to communicate with one or more external communication arrangements, such as remote servers/clouds, other vehicles and/or roadside units. The transceiver 150 can transmit and receive electromagnetic signals carrying data via a wired or wireless network, such as a cellular network, satellite communications system, or wireless local area network. The host vehicle may receive information on available routes, obstacles and traffic information via the communication arrangement. In order to provide autonomous vehicle functions, the host vehicle or systems thereof depends on the information received through the sensors and/or the communication arrangement.

Data from the sensors 110, 111, 112, 113 is coupled from the sensors to the connectivity module 140 by a data pump 120. The data pump 120 may be a separate data board for receiving data from a data bus, such as a Controller Area Network (CAN) bus, and coupling the data to the connectivity module 140. A CAN bus works by allowing any device in the network to create a "data frame", the standard message format, and transmit it sequentially. If more than one device transmits at the same time, the highest priority device continues while the others wait. Frames are received by all ECU nodes in the network and consist of an ID, a message and other items such as error correction bits. Most vehicles now have several different networks, such as for the body, the powertrain, infotainment system, the engine, the transmission control, the airbags, the ABS, the traction control and the stability control. The CAN bus allows sensors within these areas to communicate with their ECU in real time, prioritizing the most important information and helping to improve vehicle safety and performance.

The connectivity module 140 is configured to run a plurality of micro-value applications. These micro-value applications perform independent services using the data from the sensors and output a specific value or indicator that is used by a system orchestrator for vehicle control. In some exemplary embodiments, a micro-value application may monitor a specific output from a specific component matched to the micro application, such as monitoring a tire pressure value from a tire pressure sensor. In this example, the micro-value application may output an alert when the tire pressure is outside a predetermined range. The orchestrator may receive this alert, find a matching entry in a decision table in response to the alert, and generate the appropriate output in response to the decision table, data repository, and other vehicle telemetry. In the tire pressure example, the orchestrator may output a maximum speed limit to a vehicle controller in response to the tire pressure being below a threshold value and generate a user alert.

Micro-value components, such as the sensors, can be matched for specific vehicle operational requirements. Advantageously, new missions can be defined by adding or editing entries into the decision table without altering the primary software of the ECU or the software of the micro-value components. Micro-value applications can be updated individually in response to manufacturer updates, micro-value component capability changes, or the like without altering the primary software. If a new mission is defined, vehicles, users, systems, goals, location etc. are identified. In response to this mission definition, missing micro-value components can be identified and submitted for development by approved component providers. Missing components can be developed based on the lifecycle model so that each delivers the micro-value and is submitted for certification and cataloging. Micro-value components can be certified for security and mapped for purpose, feature, cataloged and stored in the cloud.

Figure 2:
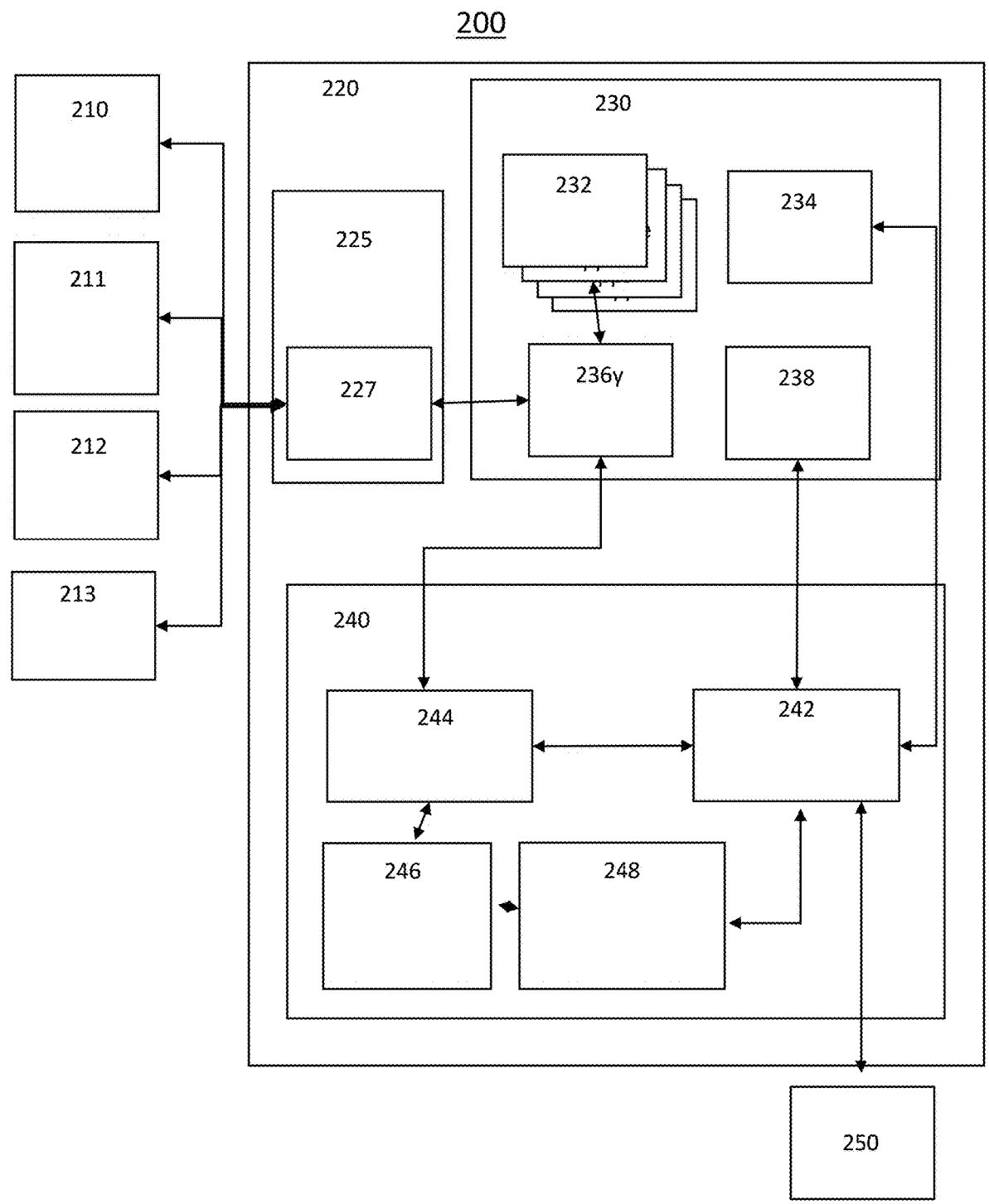
FIG. 2 shows an exemplary system for a state drive micro-value architecture is shown in accordance with various embodiments.

Turning now to FIG. 2, an exemplary system 200 for a state drive micro-value architecture is shown in accordance with various embodiments. The exemplary system includes a first sensor 210, a second sensor 211, a third sensor 212, a fourth sensor, 213 a connectivity module 220, and a transceiver 250.

The sensors 210, 211, 212, and 213 may include vehicular sensors used to detect a condition of the vehicle and a means for coupling data indicative of that condition to the connectivity module 220. Exemplary sensors may include temperature sensors, global positioning system antennas, rotational sensors, position sensors, accelerometers and the like. While four sensors are described in the exemplary embodiments, any number of sensors can be integrated into the exemplary system dependent on system design requirements. The sensors 210, 211, 212, 213 can further include non-vehicle sensors, such as mission system sensors, environmental sensors, infrastructure sensors and the like. The data from the sensors 210, 211, 212, and 213 can be coupled to the connectivity module 220 via a CAN bus or other data network connection.

The connectivity module 220 can include a data board 225, a micro application module 230 and an orchestrator 240. In some exemplary embodiments, the data board 225 may be integrated into the connectivity module 220 or may be a discrete device. The data board 225 can include a data pump 227 for receiving data from the sensors 210, 211, 212, 213 and other vehicle systems via a CAN bus or other communications network. The data pump 227 may then populate a data repository 236 with the received data. The data board 225 can eliminate the need for runtime container and has integrity without coordinated transactions by using an assembly line. The data board 225 further enables minute changes to be made to the state and incremental process. These centralized data exchanges enable data collection to be performed via single bus interface. This collected data can be stored in the data repository 236 in a single memory. In some exemplary embodiments, the data pump 227 may couple extracted data to a plurality of micro-value applications 232.

The micro application module 230 may include a decision table repository 234, a device registry 238, the data repository 236 and a processor configured to run a plurality of micro-value applications 232. The plurality of micro-value applications 232 are applications for performing functions related to one or more of the sensors 210, 211, 212, 213. In some exemplary embodiments, a micro-value application 232 may monitor an output value from a sensor 210, such as a tire pressure sensor, and generate an output data in response to the tire pressure sensor being outside a predetermined range.

In some exemplary embodiments, each micro-value application 232, which may alternately be referred to herein as a micro-value algorithm, may be configured to perform an algorithm associated with data analysis for a single sensor 210. These micro-value applications 232 may be added to the micro application module 230 when a new sensor is added to the system. In addition, when new capabilities are added or realized for a specific sensor, the micro-value application 232 can be updated to take advantage of the new capabilities without requiring an update of the main software program. When a new sensor is added to the system, the device registry 238 is updated with the sensor details and a new entry is made in the decision table repository 234.

The decision table repository 234 can be configured as a table of inputs and outputs associated with the micro-value application 232 outputs. A repository can be a collection of tables each of which enforces a "behavior" on the vehicle. A single table can be a definition of collected inputs, criteria for selection a single row in the table's logic, values to be set for each output, and a definition of where to store or transmit the set output value. In some exemplary embodiments, each micro-value application 232 is associated with a single entry in the decision table repository 234. An entry in the decision table repository 234 can include a plurality of inputs that must be satisfied for action to be taken by the orchestrator 240. The decision table repository 234 further includes a plurality of outputs to be performed in response to the input values being satisfied. In some exemplary embodiments, if the tire pressure warning is generated by the micro-value application 232, the decision table repository 234 input for that entry may indicate a tire pressure less than 28 psi. The output can include generating a user low tire pressure warning. In some exemplary embodiments, the decision table repository 234 may include a plurality of decision tables. When multiple decision tables are employed, one decision table can be used by one micro value application. Each micro value application can have multiple table entries. If the inputs match the current conditions, the output states can be applied. In some exemplary embodiments, an output may indicate not to alter any vehicle systems or control values. These multiple decision tables can be running concurrently. Decision tables can include a safety table, vehicle control table, controller system state table or the like. A decision table can be used to implement a state diagram and can be a simple decision table with one input and one output, or may be very complex with numerous inputs and numerous outputs. Vehicle behavior may be modified during the mission in real time. Can be activated on the mission or the current mode of the vehicle. Each decision table will have different inputs.

In some exemplary embodiments, the capabilities of decision tables can be employed similar to Boolean logic "and" decisions for decision making. For example a single row in a decision table could represent the condition (SENSOR1>=10 & SENSOR2>20) and another row (SENSOR 1< >0 & SENSOR<5) and so on. Further is possible to include a "don't care condition" for a sensor on any given row to implement the logic (SENSOR1<−5) where SENSOR2 would be marked as "don't care". The "don't care" operator meaning that the sensors input evaluates to always matching the criteria for that sensor. The orchestrator 240 is operative to receive notifications from the micro-value applications 233 and to generate control signals for controlling vehicle systems in response to decision table repository 234 entries associated with each of these micro-value applications 233. In some exemplary embodiments, the orchestrator 240 can include a communications director 242, a vehicle behavior supervisor 248, a state transition controller 246, and a decision table processor 244.

The vehicle behavior supervisor 248 can start and stop the decision table processor 244 from setting the initial internal variables for each decision table determination. The decision table processor 244 extracts data from the data repository 236 associated with the output value received from the micro-value application 232. The decision table processor 244 can be performed in a simple cycle that fetches and stages inputs, executes the decision table to yield new outputs, and pushes the staged outputs to their permanent set points. The internal variables are a collection of storage and services to manage the behavior of the decision table, such as local variables for state, parameters and timers. The state transition controller 246 can control a state of the host vehicle in response to the vehicle behavior and the information from the communication director 242. The vehicle behavior supervisor 248 can start and stop one or more decision tables depending on the vehicle's modes. For example, a combat mode setting might start several decision tables that change the performance behavior of the vehicle. Resetting from combat mode would cause the supervisor to stop those tables and potentially resume other tables.

The system can further include a transceiver 250 for transmitting and receiving data via a wireless communications network, such as a cellular communications network. In some exemplary embodiments, the communications director 242 may enable transmission of data from the data repository 236 and/or mission micro-value application component images to cloud based algorithms for applications such as core processes or insight determination. Assimilation of such data from across a fleet of vehicles enables cloud to provide commands with desired configuration changes proactively to the vehicles impending to run into similar situations as the vehicle that just passed through.

Figure 3:
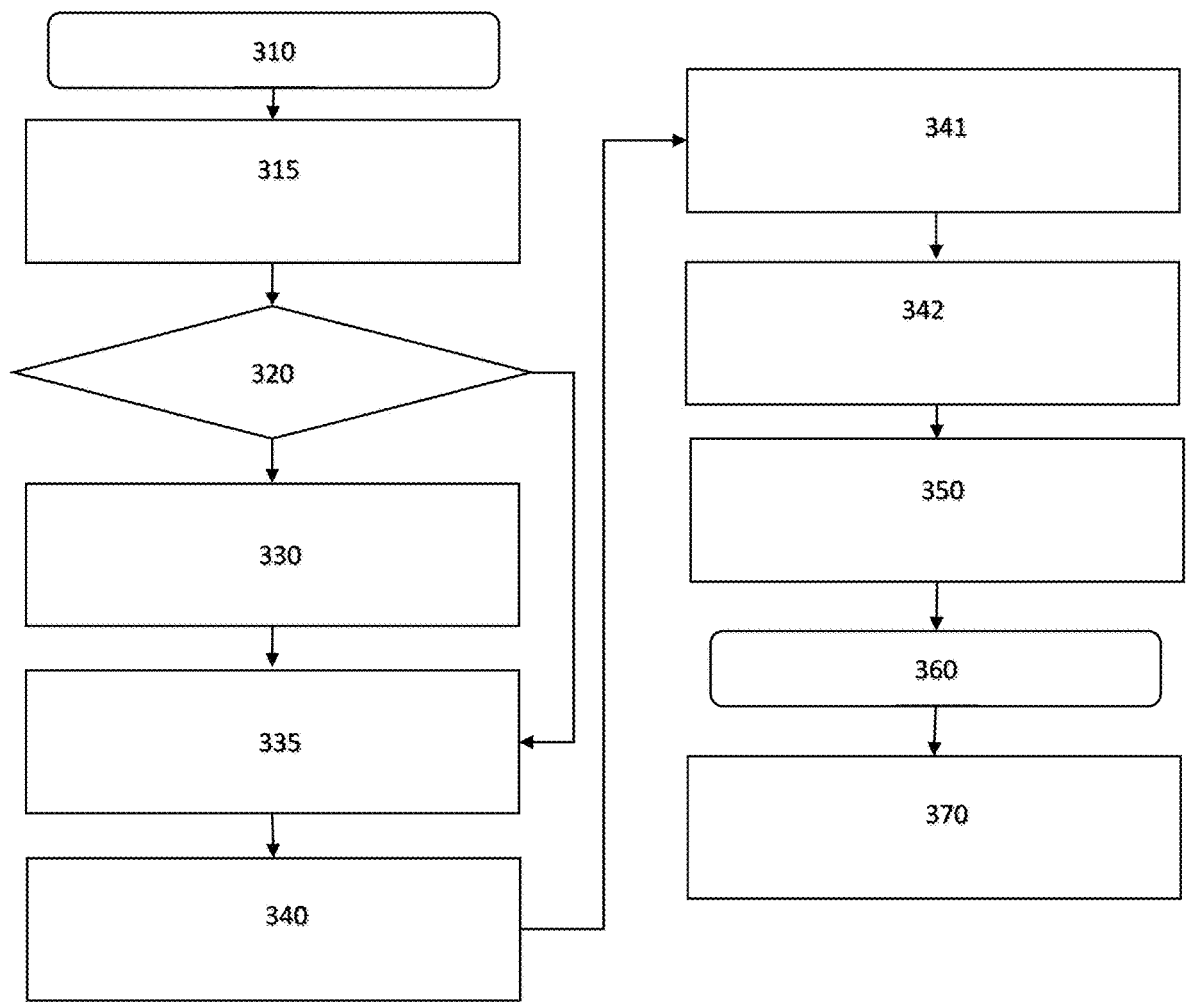
FIG. 3 shows a flow chart illustrating an exemplary implementation of a method for defining a state drive micro-value architecture for a mission according to an exemplary embodiment.

Turning now to FIG. 3, a flow chart illustrating an exemplary implementation of a method 300 for defining a state drive micro-value architecture for a mission according to an exemplary embodiment of the present disclosure is shown. While the following method is described as a series of sequential steps, some of the steps may be performed in parallel or non-sequentially. The method is first operative to define 310 the mission. Mission definition can include defining a mission purpose, capabilities and features required for accomplishing the mission. These mission purpose, capabilities and features can be mapped to required input and output data. In some exemplary embodiments, a decision table repository can be generated, having entries for each of the required mission functions with associated inputs and outputs.

Next the micro-value components are matched 315 to the vehicle operational requirements. The micro-value components can include one or more sensors and associated micro-value applications. Micro-value components can be identified for providing each of the required input and output data for the mission operation. If all of the mission required inputs and outputs are satisfied, the components can be certified 335. If required inputs and/or outputs are mission 320, missing components can next be developed 330 based on a lifecycle model such that every required nano value is delivered. These components having the missing can be added to the architecture with corresponding micro-value applications. After the missing components are added, the components can be certified 335. The micro-value components can be certified for security and mapped for purpose and features with corresponding entries in the device registry and the decision table repository.

The components relevant for the vehicle operational requirements are next packaged 340 and a digital shield can be activated to enable security and prevent unauthorized component modification and execution. The digital shield can be used to restrict unwanted system behavior based on current system conditions. The connected module can then be refreshed. The mission components are next loaded 341. Mission components can be loaded into the various vehicle systems. The mission next begins 342 and the digital shield is applied. The digital shield can be the security enforcer authentication and authorization, can be authorize a certain level. In some exemplary embodiments, the digital shield can employee four dimensions of security. The first dimension can determine if the component being executed is valid for the current mission. The second dimension can determine if the user operating the vehicle is authorized. The third dimension can determine if the correct device is being employed for the mission. The fourth dimension can determine if the mission is authorized. After packaging of the relevant components, the method is next operative to execute 350 the micro-value components including the micro-value applications and associated sensors. In some exemplary embodiments, the connectivity module executes the micro-value components, enforces the digital shield in tandem with a remote cloud. A blockchain of events can be recorded. When the mission is completed 360, post mission analytics can be run to reconcile data across the connectivity module and the cloud based data for anomalies. Events are synchronized 370 with the remote cloud via the transceiver.

Figure 4:
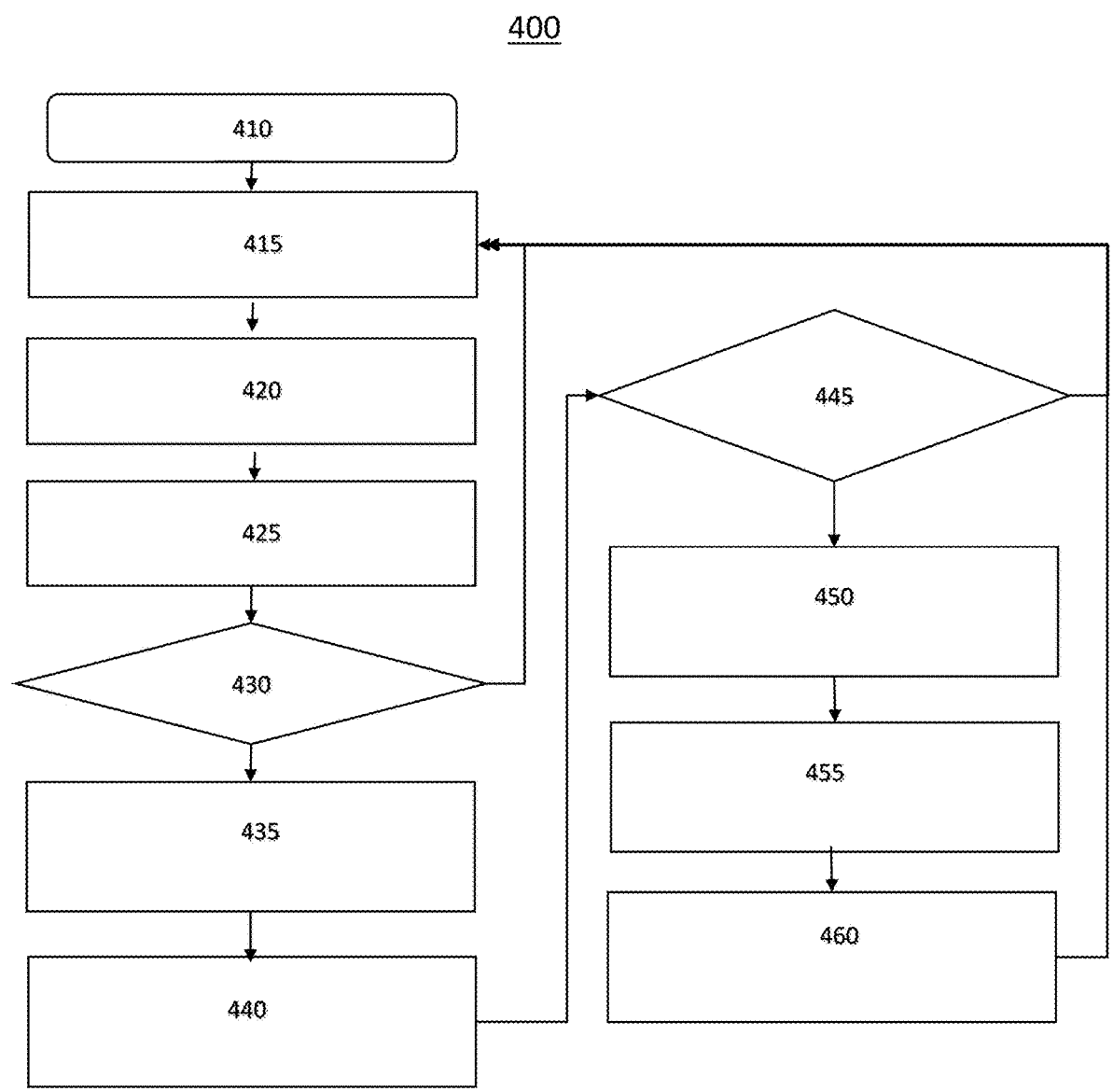
FIG. 4 shows a flow chart illustrating an exemplary implementation of a method 400 for defining a state drive micro-value architecture for a mission according to an exemplary embodiment of the present.

Turning now to FIG. 4, a flow chart illustrating an exemplary implementation of a method 400 for defining a state drive micro-value architecture for a mission according to an exemplary embodiment of the present disclosure is shown. In some exemplary embodiments, the method is first initiated in response to vehicle system initiation. The state drive micro-value architecture can be initiated in response to the application mission bundle being created and deployed, non-repudiation being verified. Ancillary services are then applied, applicable decision tables are loaded and the micro-value applications are loaded and initialized.

The method is next operative to retrieve 415 sensor data. The sensor data may be retrieved in response to a request from a data pump to the various sensors or an event causing change to vehicle state or health or performance for example fuel level below a threshold etc., or may be retrieved from a communications network, such as a CAN bus. The data can be periodically transmitted by the various sensors and other vehicle systems via the communications network. In some exemplary embodiments, the data pump may form a portion of a data board coupled to a CAN bus. The method next saves 420 these values in a data repository on a connectivity module.

Each of the micro-value applications is operative to perform 425 an associated algorithm. Each micro-value application retrieves the required data for its associated algorithm from the data repository. In some exemplary embodiments, the micro-value application may be comparing a single sensor output value with a threshold value or threshold range. If the sensor value exceeds the threshold value or is outside of the threshold range, an output is generated indicative of the threshold exceeding condition. This output can include the sensor identity, the sensor output value, a micro-value application determination value or the like. In some exemplary embodiments, the micro-value application may be indicative only of the micro-value application and a failure condition. In some exemplary embodiments, if no failure conditions are realized, the micro-value application may not generate an output 430 and the method returns to retrieving 415 subsequent sensor data for use in updating the data repository.

If the micro-value application generates an output 430, the output is coupled to the orchestrator. The orchestrator retrieves 435 the decision table repository entry associated with the output and/or the micro-value application. The orchestrator then retrieves 440 the data listed in the input entries of the decision table entry from the data repository. If required as an input, the orchestrator may further retrieve vehicle behavior data, such as vehicle speed, steering angle, brake application information and the like. In some exemplary embodiments, the method may further analyze a vehicle state change If the input conditions are met 445 for the decision table entry, the method is operative to determine 450 output actions and values in response to the data listed in the output values of the decision table entry and apply these values and/or rules to the required vehicle systems. After controlling the control system in response to the output values and rules, the method is next operative to generate 460 a transceiver log. The transceiver log 460 can be used for synchronizing data with the remote cloud via the transceiver. Post mission analytics can be run to reconcile data across the connectivity module and the cloud based data for anomalies. The method then returns to retrieving 415 subsequent sensor data for use in updating the data repository. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
   a first sensor configured to detect a first operating parameter and to generate a first sensor output signal indicative of the first control system operating parameter;
   a memory configured to store a data repository and a decision repository table;
   a data pump configured to receive the first sensor output signal and generate a first entry in the data repository indicative of the first sensor and the first control system operating parameter;
   a first processor for performing a first micro-value algorithm and for generating a first micro-value output in response to the first entry in the data repository;
   a second processor for performing a vehicle algorithm and for generating a control signal indicative of a first output in the decision repository table in response to the first micro-value output and the first entry in the data repository; and
   a system controller configured to control a system in response to the control signal.

2. The apparatus of claim 1 wherein the first vehicle operating parameter is a tire pressure, the first micro-value output is indicative of the tire pressure being less than a threshold value and the vehicle controller is configured to limit a vehicle speed.

3. The apparatus of claim 1 further comprising a second sensor to detect a second operating parameter and wherein the first processor is further configured to perform second micro-value algorithm for generating a second micro-value output signal in response to a second entry in the data repository indicative of the second sensor and the second operating parameter.

4. The apparatus of claim 1 further comprising a second sensor to detect a second operating parameter and wherein the first micro-value output is generated in response to a second entry in the data repository corresponding to the second operating parameter.

5. The apparatus of claim 1 wherein the controller is further operative to generate a data signal indicative of a control status and wherein the control signal is generated in response to the control status, the first micro-value output and the first entry in the data repository.

6. The apparatus of claim 1 further comprising a transceiver for transmitting the first micro-value output and the first entry in the data repository to a server via a wireless network.

7. The apparatus of claim 1 wherein the data pump receives the first sensor output signal via a controller area network bus and couples a data value representative of the first sensor output to the data repository.

8. The apparatus of claim 1 wherein the first micro-value output is coupled to the second processor via an application programming interface.

9. The apparatus of claim 1 wherein the data pump is further operative to receive a plurality of sensor values from a plurality of sensors and to generate a plurality of data repository entries indicative of the plurality of sensor values and the plurality of sensors and wherein the first processor is further operative to perform a plurality of micro-value applications wherein each of the plurality of micro-value applications is associated with one of the plurality of sensors.

10. A method comprising:
    detecting, by a first sensor, a first operating parameter;
    generating, by the first sensor, a first sensor output indicative of the first operating parameter;
    populating, by a data pump, a first data repository entry indicative of the first sensor and the first vehicle operating parameter;
    generating, by a first processor, a first micro-value output in response to the first data repository entry and a first micro-value algorithm associated with the first sensor;
    generating, by a second processor, a first control signal in response to the first data repository entry, the first micro-value output and a first decision repository table entry associated with the first micro-value output; and
    controlling, by a controller, a in response to the first control signal.

11. The method of claim 10 including coupling, by an application programming interface, the first micro-value output from the first processor to the second processor.

12. The method of claim 10 wherein the first vehicle operating parameter is an engine temperature and wherein the first micro-value output is indicative of the engine temperature exceeding a threshold value and wherein the vehicle controller is configured to limit a vehicle speed in response to the first vehicle control signal.

13. The method of claim 10 wherein the first micro-value algorithm can be updated without altering an algorithm performed by the second processor to generate the first vehicle control signal.

14. The method of claim 10 further operative for generating, by the first processor, a second micro-value output in response to a second data repository entry and a second micro-value algorithm associated with a second sensor.

15. The method of claim 10 wherein the first micro-value output is generated in response to a second data repository entry associated with a second sensor.

16. The method of claim 10 further operative for generating a user alert, via a user interface, in response to the first vehicle control signal.

17. The method of claim 10 wherein the first decision repository table entry includes a plurality of input conditions and a plurality of vehicle system settings.

18. The method of claim 10 further operative for generating a vehicle operating status and wherein the first vehicle control signal is generated in response to the vehicle operating status and the first decision repository table entry.

19. A control system comprising:
- a first sensor for generating a first data signal in response to a first vehicle condition;
- a second sensor for generating a second data signal in response to a second vehicle condition;
- a memory configured to store a data repository and a decision table;
- a data controller for generating a first data repository entry in the data repository in response to the first data signal and a second data repository entry in the data repository in response to the second data signal;
- a first processor for generating a first micro-value output signal in response to a first micro-value algorithm and the first data repository entry and for generating a second micro-value output signal in response to a second micro-value algorithm and the second data repository entry;
- a second processor for generating a first vehicle control signal in response to a vehicle control algorithm, the first micro-value output signal, the first data repository entry and a first decision table entry associate with the first sensor and for generating a second vehicle control signal in response to the vehicle control algorithm, the second micro-value output signal, the second data repository entry, and a second decision table entry associated with the second sensor; and
- a vehicle controller for controlling at least one of a throttle controller, a steering controller and a brake controller in response to the first vehicle control signal and the second vehicle control signal.

20. The control system of claim 19 further including an application programming interface for coupling the first micro-value output signal and the second micro-value output signal from the first processor to the second processor.

* * * * *